Jan. 23, 1934.  W. J. ROEPKE  1,944,576
COMBINATION ROAD LIGHTING AND REFLECTING
SAFETY DEVICE FOR MOTOR VEHICLES
Original Filed May 28, 1930   2 Sheets-Sheet 1
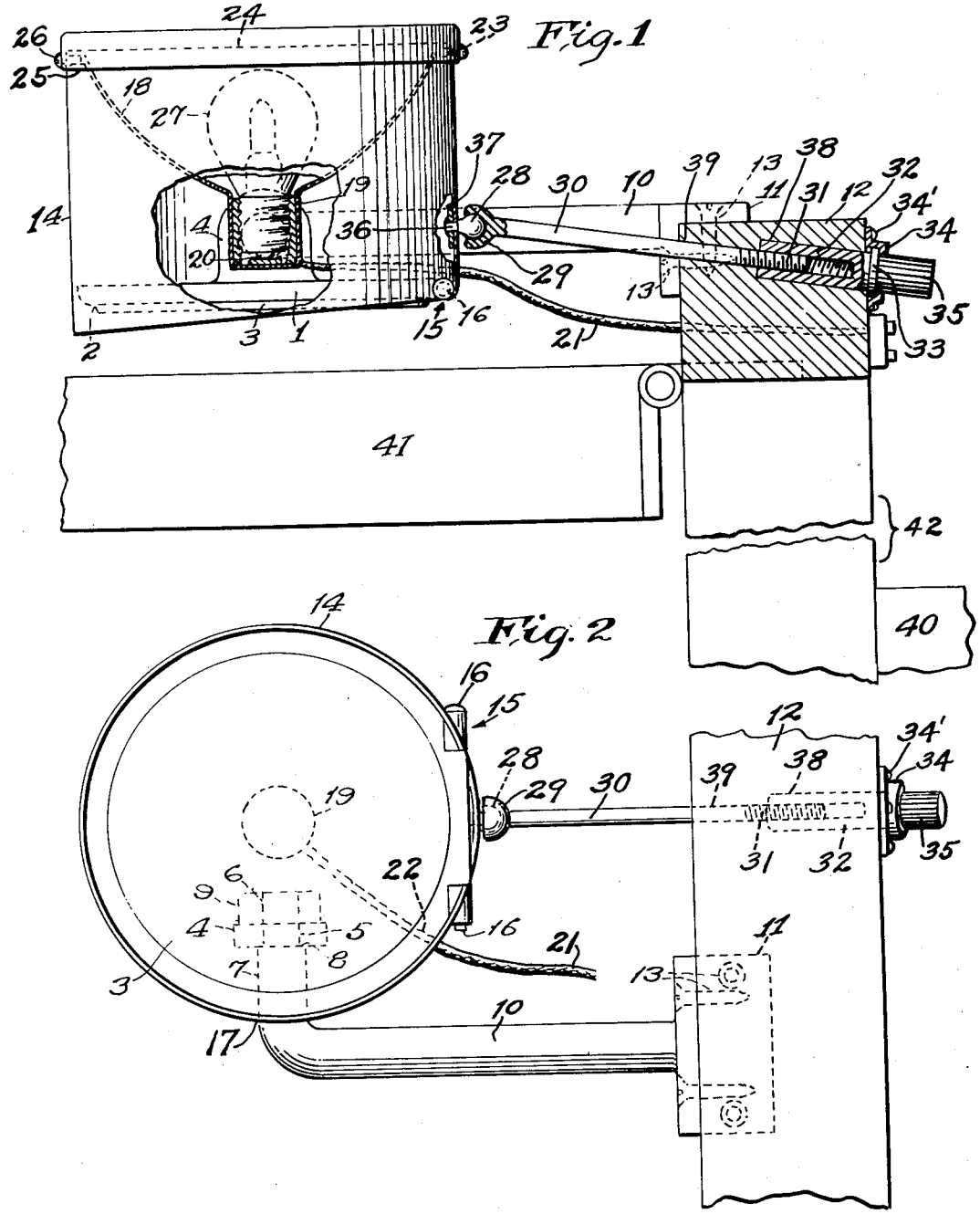
Witness
C. H. Whitmore
Inventor
William John Roepke
by James R. Townsend
his Atty

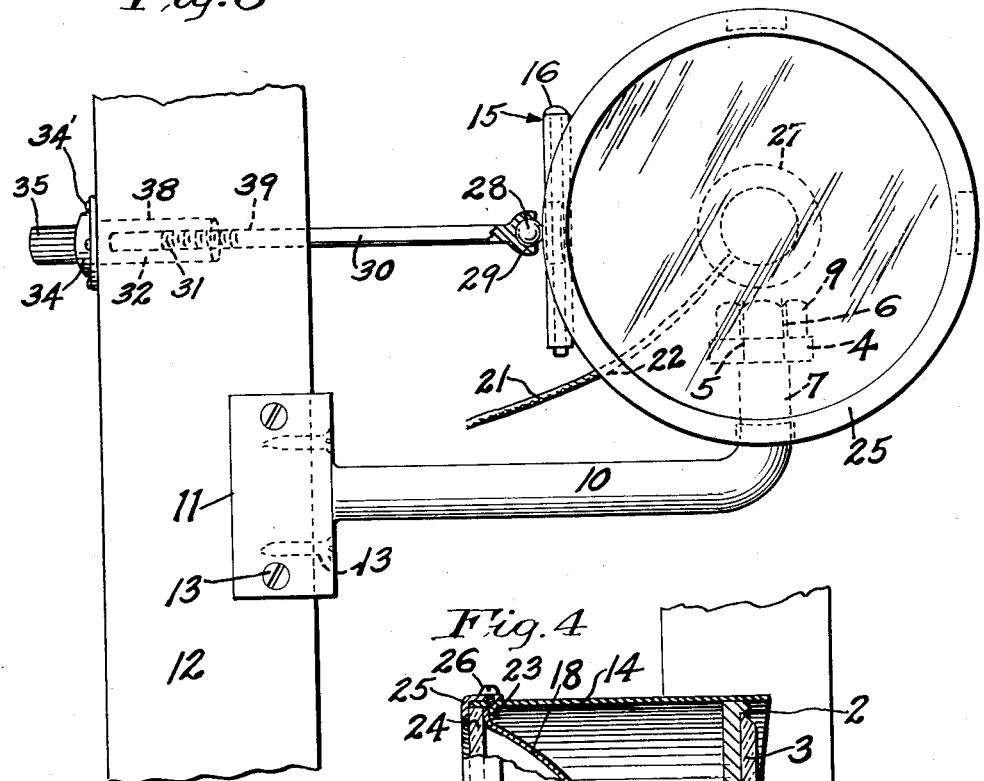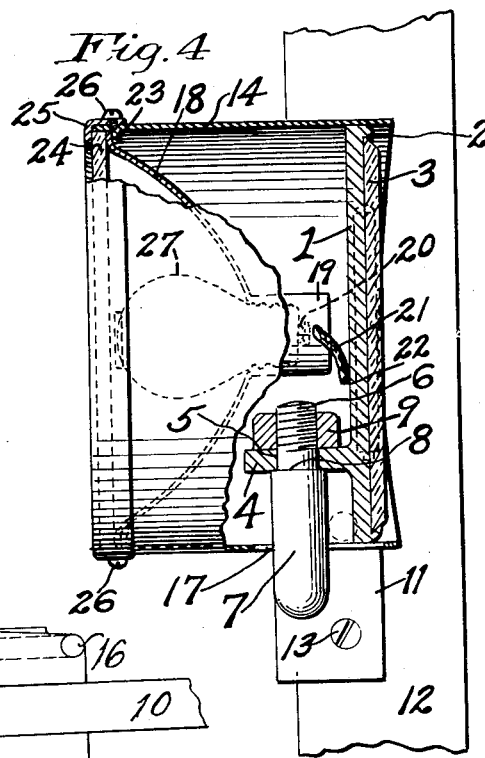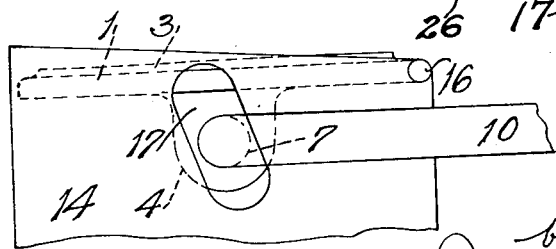

Patented Jan. 23, 1934

1,944,576

UNITED STATES PATENT OFFICE 1,944,576

COMBINATION ROAD LIGHTING AND REFLECTING SAFETY DEVICE FOR MOTOR VEHICLES

William John Roepke, Los Angeles, Calif.

Application May 28, 1930, Serial No. 456,595
Renewed June 16, 1933

7 Claims. (Cl. 240—61.13)

At present it is the rule of the road in the United States that vehicles move forward on the right side of the road, and it is thus customary for the driver's station to be on the left side of the vehicle and the invention will be illustrated herein according to such rule and custom; it being understood that if the rule and custom were reversed, it would be applicable to the right side instead of the left.

The invention may be carried out in various ways and forms, and will be understood by an embodiment which will be illustrated and described herein, and that comprises a lamp having a frame and constructed and arranged to practically direct light of the lamp forwardly, only, and a mirror connected to the frame of the lamp and arranged to direct its reflections rearwardly at an angle to the vehicle, the light will illuminate the left side of the road forwardly of such vehicle and the mirror will direct rearwardly toward the driver's seat of the vehicle, a reflection of the road rearwardly of the vehicle.

I have constructed the appliance so that in practice it is mounted at the left of the vehicle and throws its light forwardly so that it will illuminate the left side of the road over which the vehicle is traveling, thus to give drivers of vehicles approaching each other such warning that likelihood of head-on collisions will be minimized; and such appliance is also at the same time directing toward the driver of the equipped vehicle, a view of the road behind the vehicle so that the driver will at all times, by the use of this accessory, have in view such vehicles as may be approaching at the front and also at the rear of the vehicle he is driving.

In carrying out the invention, I have hinged together a lamp and a mirror, back to back, and have provided means for angular adjustment of the mirror and lamp relative to each other; and I have also provided means for adjustably connecting the mirror and lamp independently of each other, to the body of the vehicle to be equipped; and with this end in view, the mirror has a rigid backing, and the lamp a rigid housing, hinged together and means are provided whereby each is adjustably connected to the automobile frame and is fixed to the other, and means whereby each is fixed to the automobile frame independently of the other.

An object is cheapness of construction, ease of installation and ready adjustment of the lamp and mirror relative to the machine and to each other and with respect to the road and the driver's seat.

An advantage is assistance toward overcoming fears of nervous drivers and thus affording comfort to the driver and other occupants of the car; and reducing the likelihood of interference of nervous front seat occupants with the driver's steering wheel.

The broad principle of the invention is such that a fixture embodying the same can be attached to spare tires mounted at the front left hand side of the machine, and also to the left front fender, but it is not necessary to show all modes of support for the device, and the invention will be illustrated herein as constructed for attachment to the upright front left hand post of the windshield of the machine.

It is understood that greater or less latitude of movement of the lamp may be provided for within the judgment or purpose of the constructor so that the lamp may be used as a dirigible spot light; but it is sufficient for the drawings to show one form of means to adjust and hold the light and mirror with special reference to giving the driver clear view of forwardly and rearwardly approaching vehicles.

Other objects, advantages and features of invention may appear from the accompanying drawings, the subjoined detailed description and the appended claims.

The accompanying drawings illustrate the invention in the form at present deemed most desirable.

Figure 1 is a fragmental plan view partly in section, facing toward the front and showing fragments of an automobile equipped with this invention in place on the left wind-shield post or front corner post of the car body; the left front door of the car being shown wide open, thus to indicate the location of the device in this form of embodiment and installation; the car structure is indicated in a diagrammatic manner.

Fig. 2 is a rear view of the appliance shown in Fig. 1; a fragment of the automobile wind-shield post being shown.

Fig. 3 is a front view of the invention shown in Figs. 1 and 2, attached to a fragment of a post.

Fig. 4 is a side elevation partly in vertical axial section, of the device shown in Figs. 1, 2 and 3, attached to a fragment of a post of an automobile frame.

Fig. 4a is a fragmental bottom plan detail view of the lamp showing the orifice and the bracket post extending therethrough.

The circular supporting mirror plate 1 is provided on the rear side with a seat 2 for the mirror 3, and on the front side with a bracket lug 4 having a vertical hole 5 therethrough adapted to accommodate the pin 6 of a shouldered bracket post 7 onto the shoulder 8 of which, the lug 4 is clamped by a nut 9.

The bracket post 7 is an upwardly extending terminal of a horizontal bracket arm 10 that is provided with an angle plate 11 having wings adapted to embrace the forward outer corner of the automobile left front corner post 12 and provided with screw holes to accommodate wood screws 13 for attachment to the corner post. The lamp frame or housing 14 is a hoop-like open ended cylindrical shell, hinged as at 15 to the mirror plate 1, which is loosely fitted in the housing, so that the lamp may be swung horizontally on the hinged pintle 16 which is parallel to the produced axis of the pin 6.

It is understood that the mounting of the lamp must be such that the beams from the light will be directed downwardly sufficiently to comply with the law against throwing the light directly into the face of the driver of an approaching vehicle.

The shell is provided in its lower side with an orifice 17 to loosely accommodate the post 7 which is inserted up through such orifice and through the lug 4, and is fixed in place by tightening the nut 9.

When the shell is hinged to the plate, the plate may be adjusted to any required position on the bracket to throw the light where required, and then will be fixed to the bracket by tightening the nut 9. Thus the lamp is hinged to the mirror, and the mirror is fixed to a support, the reflector is fixed to the lamp shell and the light is fixed to the reflector.

The shell is open at the front end to seat a reflector 18 that has the central rearwardly extending socket 19 with contacts 20 connected to an electric cord 21 which in the operation of assembling, will be inserted into the shell and will then be led out of the shell through an orifice 22.

The open end of the shell is provided with a stop 23 as shown in Fig. 4 for seating the lamp reflector 18, and the reflector is adapted to be held in place by a lens 24 secured to the shell by the rim fastener 25 fixed onto the shell by short screws 26.

The lamp socket 19 is of standard construction and is carried by the reflector 18 through the center of which it opens forwardly, and the electric light 27 of common construction is screwed into the socket before the lens is put into place.

The shell 14 is provided with a ball and socket connection comprising a joint member 28 articulating with a second joint member 29 fixed on the end of a push and pull rod 30, terminating in a threaded end 31, screwed into an adjusting socket 32 provided with a threaded collar 33 and journalled in the corner post 12 and held against end thrust by a thrust bearing 34 fixed to the corner post 12.

The adjusting socket 32 has a milled head 35 by which it may be turned for adjusting the lamp to the desired angle after complete installation on the vehicle. The clamp nut 9 is left loose enough to allow the mirror to be adjusted and the nut tightened before the reflector, the lens and rim fastener are put into place.

It is understood that the push and pull rod 30 may be adapted for more or less ample spot-light adjustment by quicker or slower threads or other means within the judgment of the constructor without departing from the spirit of the invention.

To assemble the push and pull rod, and the shell, the ball stem 36 of the ball and socket connection 28, 29, will be inserted through the side of the shell and through a washer 37 and will be secured in place by suitable means as by riveting, as indicated in Fig. 1.

To assemble the device, the mirror plate 1 will be inserted into the rear end of the shell 14 and will be hinged to the shell by the pintle 16. Then the bracket post 7 will be inserted through the hole 17 in the shell and its pin 6 will be inserted through the hole 5 in the lug 4 and will be loosely secured by the nut 9.

The reflector will be provided with a lamp socket having the electric contacts 20, and the cord 21 connected thereto, and such cord will be inserted into the shell and run out through the orifice 22; and then the lamp shell and mirror will be ready for installation on the machine.

In preparation for installation on an automobile, a hole 38 will be bored into the corner post 12 to receive the adjusting socket 32, and a smaller hole 39 will be bored to receive the threaded end of the push and pull rod 30; then the socket 32 will be inserted in the hole 38 and secured by the thrust bearing 34 fastened by a screw 34', and the angle plate 11 will be brought into position and secured to the post 12.

To install the device on the automobile, the bracket 10 will be secured by screws 13 through its wings 11 to the forward outer corner of the left-hand corner post 12 of the automobile. The mirror frame or backing 1 with the mirror hinged thereon is inserted into the shell and the lug 4 is brought into position over the orifice 17, and the post 7 is inserted up through the orifice 17, and the pin 6 through the bracket, and the nut 9 is screwed into place, meanwhile, adjusting the mirror to position for projection to the driver's seat reflection of what is behind the machine; then the nut 9 will be tightened to fix the mirror in place on the post 7.

The reflector 18 will then be inserted into the front end of the shell, the electric cord 21 being drawn through the hole 22, and then the reflector will be secured as above indicated. The lamp 27 will be screwed into the lamp socket 19, the lens 24 will be inserted into the shell and the rim fastener 25 will be fixed to the shell by the small screws 26.

When thus installed, the height of the lamp should be about four inches below the level of the face of the driver while sitting on the driver's seat 40; and it will be forwardly of the door 41; and the lamp bracket 7 should tip slightly forward so as to throw the light downwardly to comply with the law and keep the light from being thrown into the eyes of the on-coming drivers, this will tilt the mirror slightly upward which is the proper angle.

41 indicates the door and 42, the body of the machine. Thus mounted, the lamp can be swung through a horizontal arc and adjusted by turning the milled head 35.

To readjust the mirror, the lens and reflector must first be removed to give access to the nut 9, and after adjustment must be replaced.

I claim:—

1. The combination with a lamp; of a mirror mounted inside the lamp and adapted and arranged to direct reflection of rearward objects; and means to direct the lamp and its light rays at different angles while the mirror inside the lamp remains at a fixed angle.

2. The combination with a lamp constructed and arranged to direct its light rays forward and sideward; of a mirror mounted inside the lamp and adapted and arranged to direct reflection of rearward objects; and means to establish various angles of adjustment of the lamp and its light rays while the mirror inside the lamp remains stationary.

3. The combination with a lamp shell provided with a reflector and a mirror back to back inside the lamp shell; a support for the mirror and lamp shell; means whereby the mirror is fastened at a fixed angle to the support; and means whereby the lamp shell and reflector can be rotated around the support.

4. The combination with a lamp; a mirror; the mirror located inside the lamp; means to direct light rays forwardly and mirror reflection rays rearwardly; and means for adjusting and fixing the angular relation of the lamp light source, while the mirror remains in a fixed or stationary position.

5. A lamp bracket adapted to be fixed to a conveyance; a lamp; a reflector and mirror arranged back to back inside the lamp; a lamp reflector and mirror mounted on the bracket; and means for moving the lamp and reflector at various angles around the bracket while the mirror inside the lamp is locked stationary to the bracket.

6. In combination with a lamp; a reflector and mirror arranged back to back inside the lamp; means for turning the lamp and reflector; and means for holding the mirror stationary while the lamp and reflector are being turned.

7. In combination with a lamp; a reflector and mirror inside the lamp; means for directing the rays of the reflector; and means for holding the mirror stationary while the reflector rays are being changed or directed.

WILLIAM J. ROEPKE.